1-2 SHIFT CAPACITY SCHEDULING AND ACCUMULATOR VALVES 1-2 SHIFT CAPACITY SCHEDULING AND ACCUMULATOR VALVES

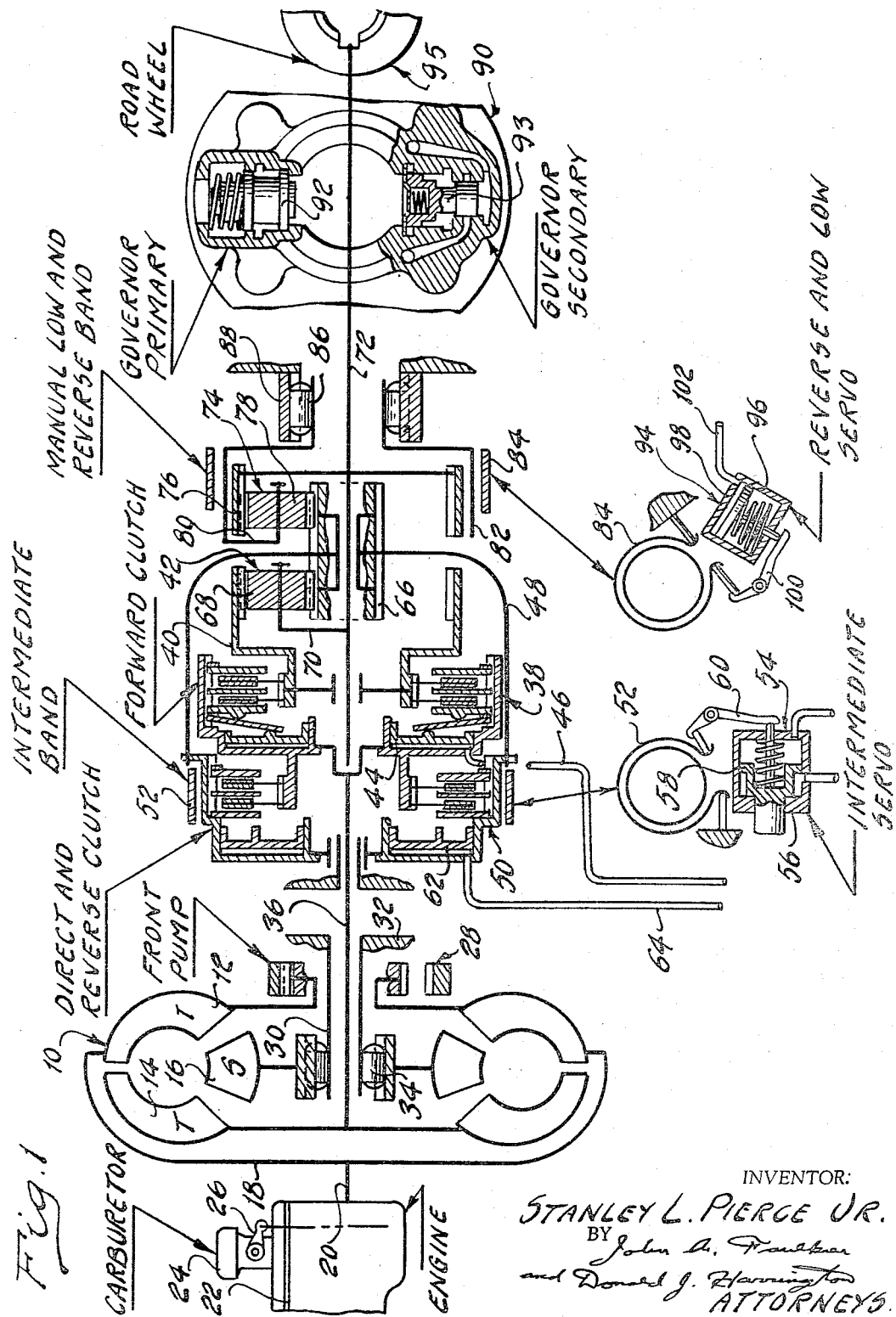

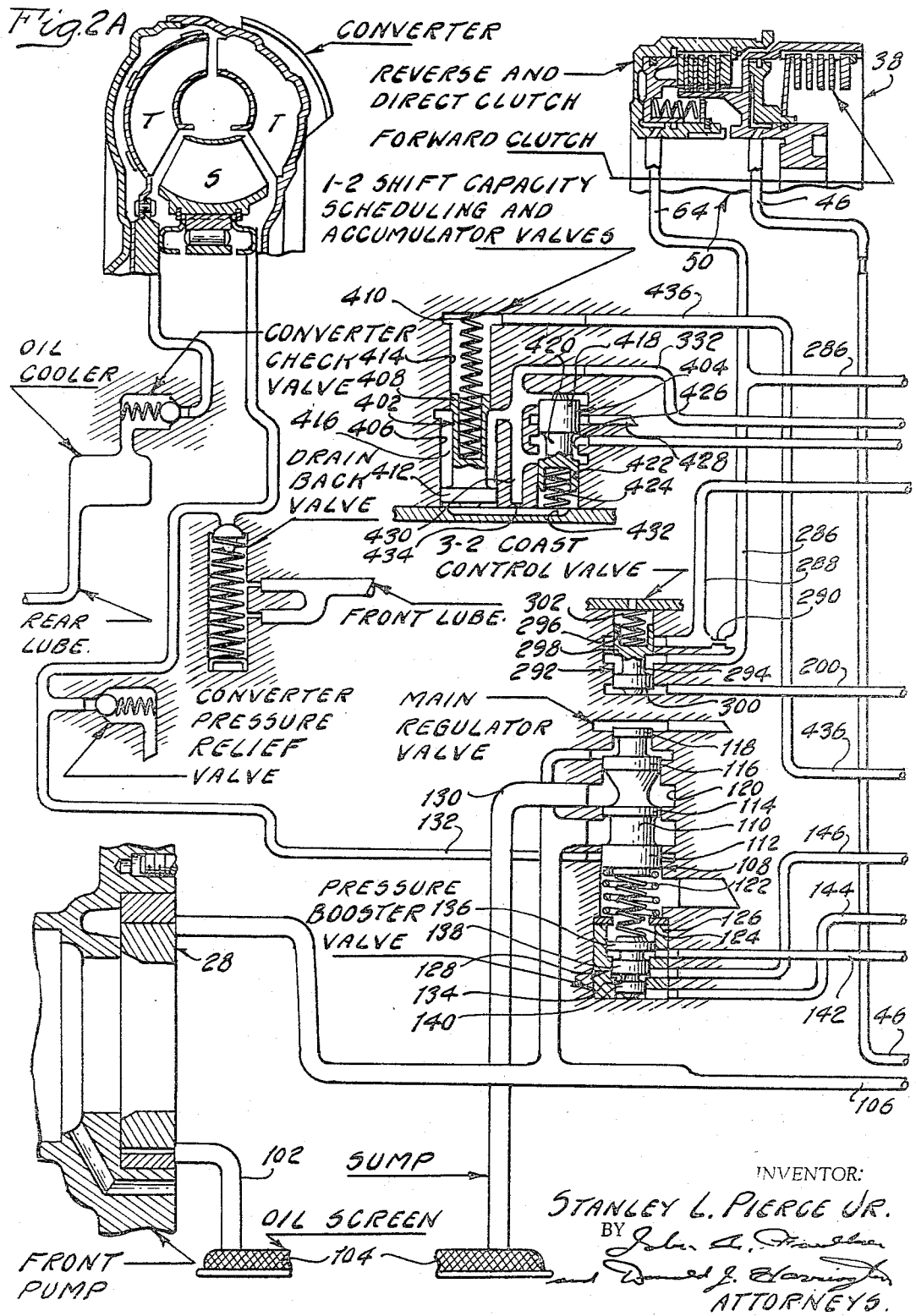

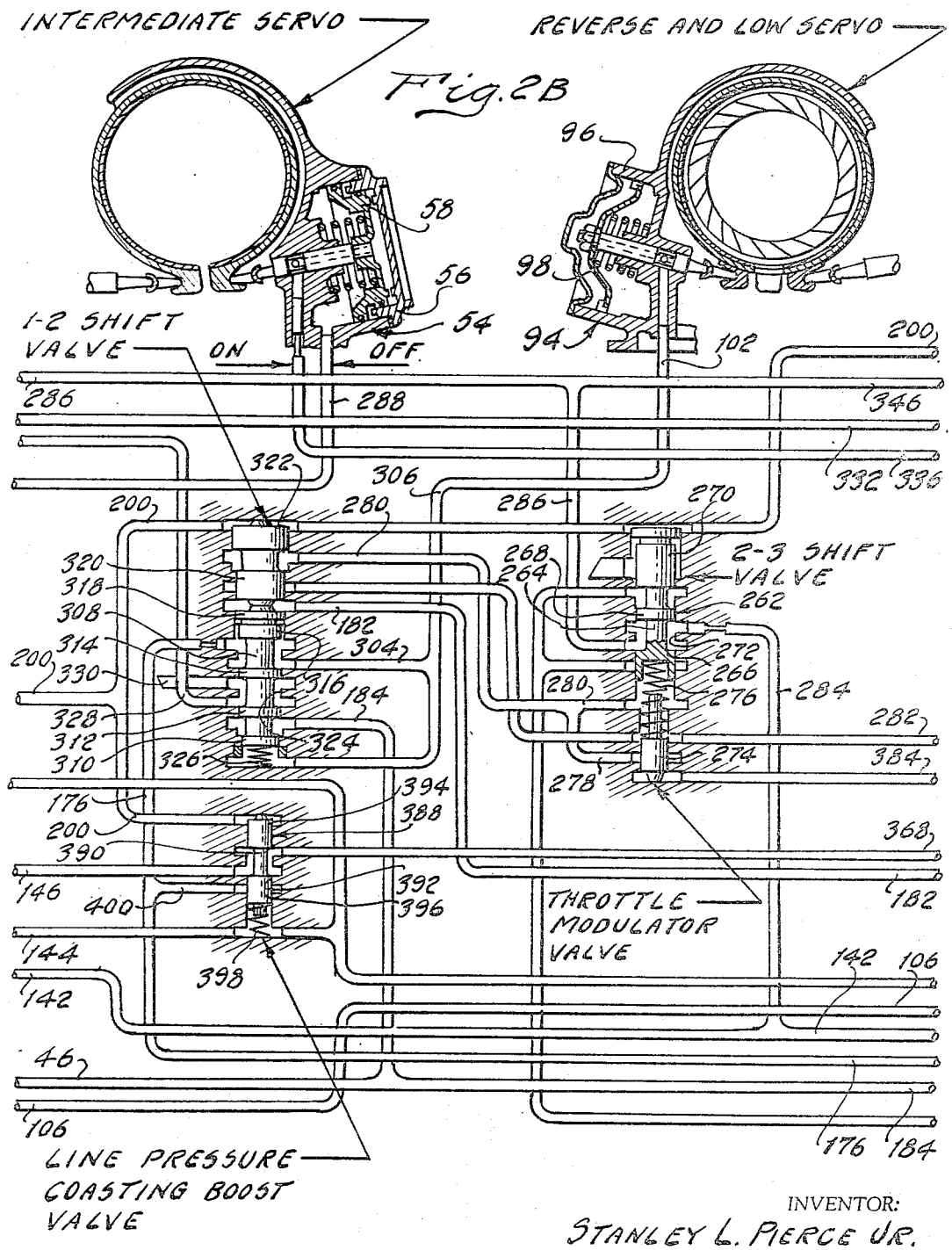

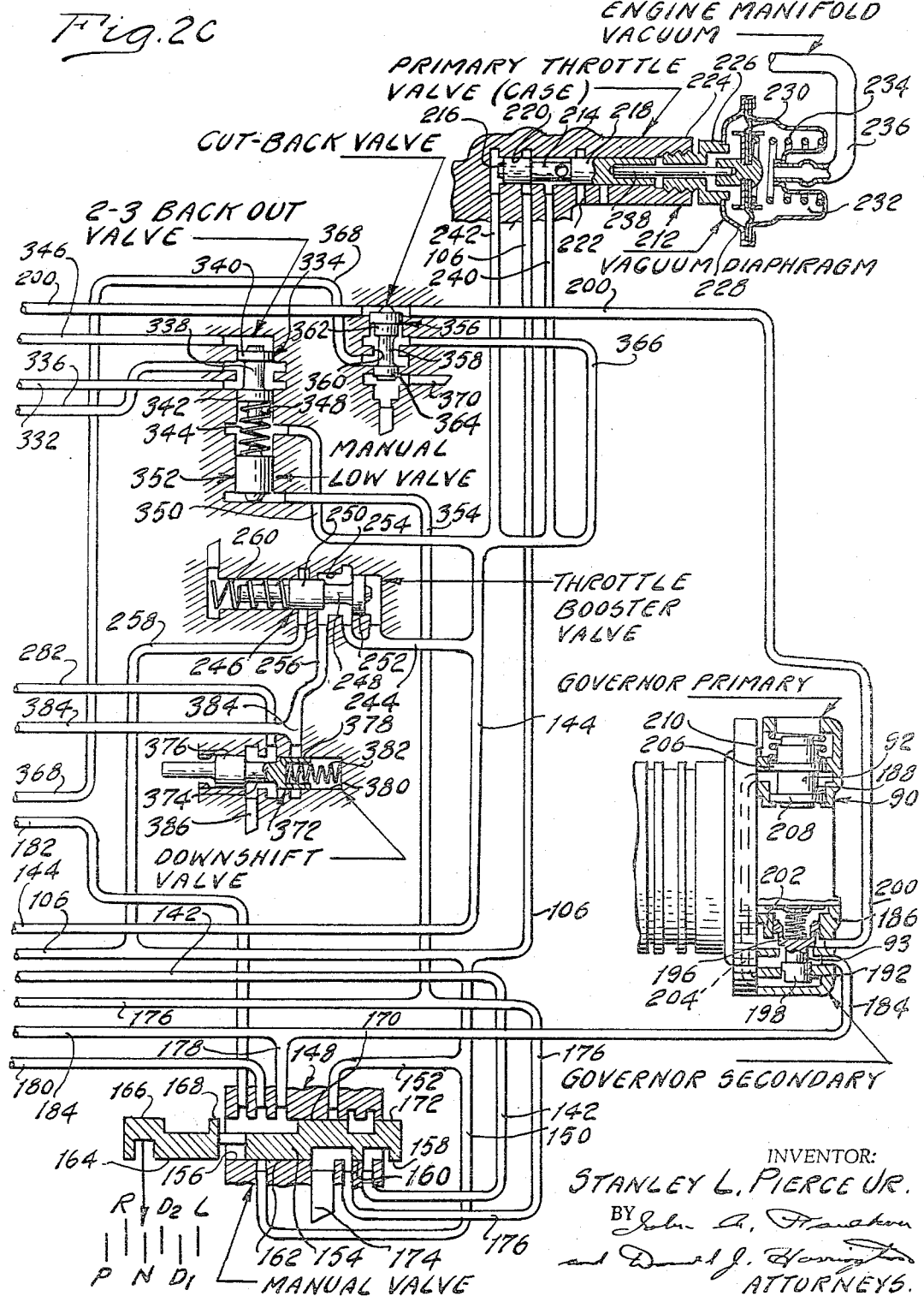

INVENTOR:
STANLEY L. PIERCE JR.
BY
ATTORNEYS.

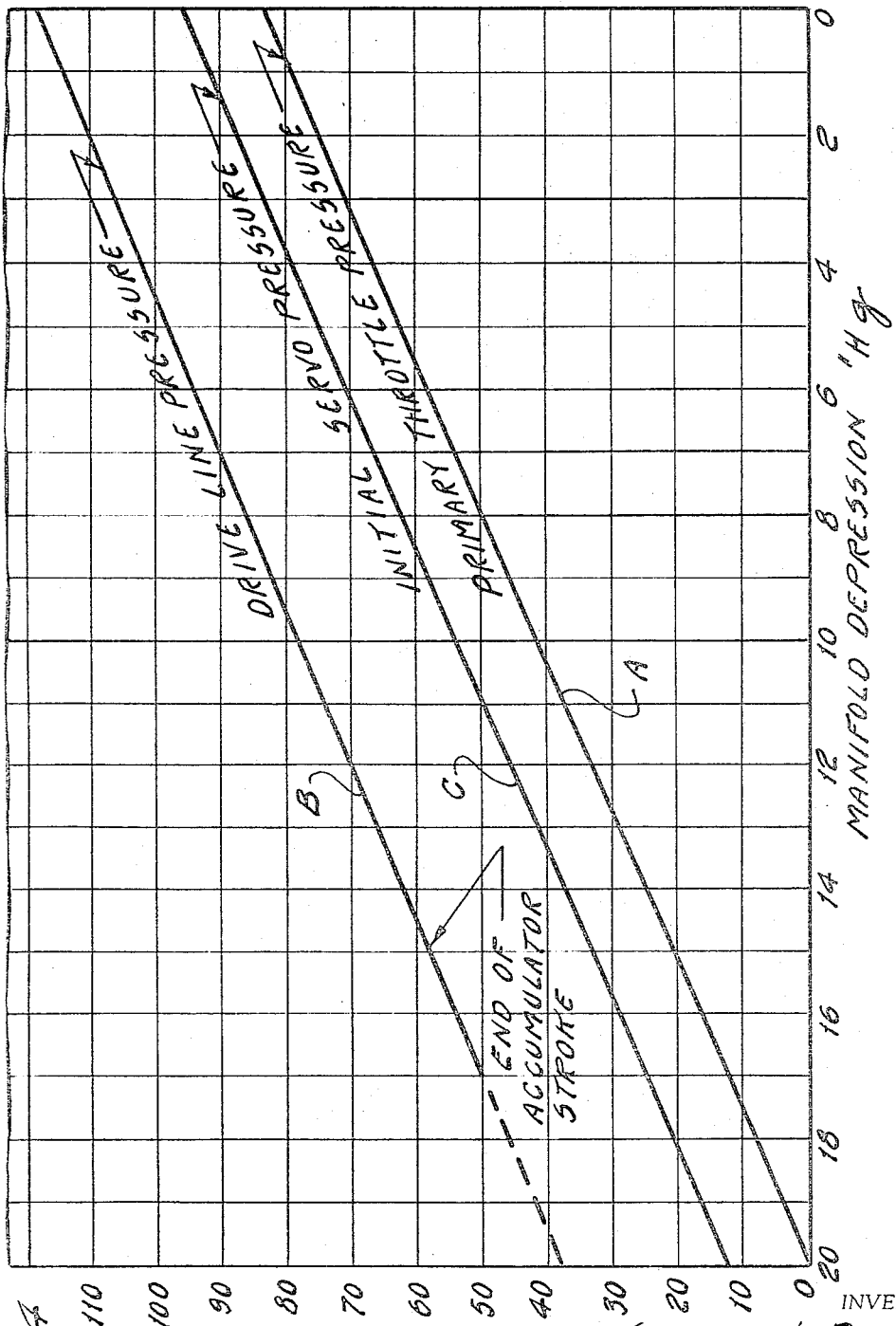

United States Patent Office 3,309,939
Patented Mar. 21, 1967

3,309,939
AUTOMATIC CONTROL VALVE SYSTEM FOR A MULTIPLE SPEED-RATIO POWER TRANSMISSION SYSTEM
Stanley L. Pierce, Jr., Madison Heights, Mich., assignor to The Ford Motor Company, Dearborn, Mich., a corporation of Delaware
Filed Jan. 21, 1965, Ser. No. 426,928
12 Claims. (Cl. 74—472)

My invention relates generally to multiple speed-ratio power transmission mechanisms for use in automotive vehicle drivelines. More particularly, it relates to improvements in an automatic control valve system for controlling speed-ratio changes in a multiple speed-ratio power transmission system.

The principles of my invention can be applied to automotive vehicle power transmission mechanisms of various designs. In a preferred embodiment my invention has been adapted for use in a power transmission mechanism having a pair of simple planetary gear units with elements that cooperate with each other to provide plural torque delivery paths extending from a turbine member of a hydrokinetic torque converter unit to a driven member, the latter in turn being connected to the vehicle traction wheels through a suitable drive shaft and differential and axle assembly.

The transmission system of this disclosure includes a planetary gear arrangement in which the relative motion of the elements of the gear arrangement is controlled by friction clutches and brakes that may be applied and released selectively in response to changes in fluid pressure distribution to associated fluid pressure operated servos. A power input element of the gear arrangement is connected drivably to the turbine of a hydrokinetic torque converter. The converter includes an impeller situated in toroidal, fluid flow relationship with respect to the turbine. The impeller is connected in turn to the crankshaft of an internal combustion vehicle engine.

A fluid pressure operated forward clutch connects drivably the turbine driven shaft to a first power input element of the gear arrangement during forward drive operation in the various speed-ratios. To establish the lowest speed-ratio, provision is made for braking another element of the gear arrangement. The power output element of the gear arrangement is connected drivably to the driven drive shaft. The means for braking the reaction element is in the form of an overrunning brake that is effective to distribute reaction torque to the stationary transmission housing during operation in the forward drive, low speed-ratio.

The overrunning brake is incapable of accommodating reaction torque when the direction of the rear reaction torque is reversed. Provision is made, however, for complementing the action of the overrunning brake by using a selectively engageable friction brake that is capable of accommodating torque reaction regardless of the direction in which it is acting. A fluid pressure operated servo is provided for applying and releasing this friction brake.

To establish a speed-ratio change from the lowest speed-ratio to an intermediate, underdrive, speed-ratio, another element of the gear arrangement is anchored by applying the second selectively engageable friction brake mechanism. If it is assumed that the low speed-ratio friction brake is released under these conditions, an automatic pickup shift is obtained as the overrunning brake freewheels following application of the intermediate speed-ratio friction brake. A subsequent speed-ratio change from the intermediate, underdrive ratio to a direct drive, high speed-ratio is obtained by applying a second fluid pressure operated friction clutch which connects a second power input element of the gear arrangement to the turbine driven shaft. The other friction clutch remains applied as both friction brakes are released. Thus the elements of the gear arrangement are locked together for rotation in unison with a 1:1 speed-ratio.

It is desirable in arrangements of this type to cushion the speed-ratio shift from a low speed-ratio to the intermediate speed-ratio by modifying the rate of engagement of the intermediate speed-ratio brake band servo. Thus, a smooth transmission of power during a shift from the low speed-ratio to the intermediate speed-ratio can occur without interruption as the vehicle is accelerated from a standing start. The control system responds to changes in vehicle speed and engine torque to initiate engagement and release of various servos to accomplish the speed-ratio changes whenever the control system is conditioned for a shift from the low speed-ratio to the intermediate speed-ratio. The quality of the shift that occurs can be improved considerably by applying the teachings of my invention.

In the improved control system of which my invention forms a part there is provided a fluid pressure source in the form of a positive displacement pump that is driven by the vehicle engine. Conduit structure provides fluid communication between the pump and the fluid pressure operated clutch and brake servos. The conduit structure is defined in part by fluid pressure distributor valves that selectively distribute actuating control pressure to the servos to initiate speed-ratio changes. The shift valves respond to pressure signals that are proportional in magnitude to operating variables such as engine torque and vehicle speed.

The intermediate speed-ratio brake servo comprises a cylinder and a double acting piston which cooperate to define a pair of opposed fluid pressure working chambers. By distributing pressure through an appropriate distributor valve to one fluid pressure working chamber, the intermediate speed-ratio brake becomes applied as the piston is advanced toward a brake applying position against the opposing influence of a piston return spring. Upon a subsequent upshift to the high speed-ratio condition, pressure is distributed simultaneously to the high speed-ratio clutch and to the other fluid pressure working chamber of the intermediate servo. Thus both intermediate servo pressure chambers become pressurized as the intermediate servo piston is stroked to a brake releasing position.

I have provided a shift capacity scheduling and accumulator valve system that is in fluid communication with the hydraulic connection between the intermediate servo pressure apply chamber and the shift valve that is effective to establish a speed-ratio change from the low speed-ratio to the intermediate speed-ratio. The scheduling and accumulator valve system modifies the rate of pressure build-up on the apply side of the intermediate servo as the pressure distributor valve associated therewith is moved to an upshift position following operation in the lowest speed-ratio. This modification is accomplished by means of a so-called regulator valve and a companion modifier valve that cooperate to delay the application of full brake applying pressure to the intermediate servo following a shift of the intermediate speed-ratio distributor valve. The regulator portion of the scheduling and accumulator valve system initiates and terminates the regulating function in accordance with the intelligence that is transmitted to it by its companion valve. The companion valve senses the torque distributing requirements of the driveline system to delay the regulating action to a degree that is dependent upon the engine torque being delivered under the particular driving conditions that are imposed upon the driveline.

The two valves of the scheduling and accumulator valve system function together to produce a so-called accumulating action, and this action occurs during the stage of the ratio shift interval that will produce optimum shift quality regardless of the changes in the road load, torque transmitting requirements of the driveline.

The provision of an improved automatic control valve system of the type above set forth being a principal object of my invention, it is a further object of my invention to provide an automatic control valve system for a multiple speed-ratio power transmission mechanism wherein provision is made for modifying the action of a fluid pressure operated servo for a friction torque establishing device. I contemplate that this can be accomplished without the necessity for providing accumulator chambers and movable accumulator pistons of the type found in well known prior art constructions.

It is a further object of my invention to provide a scheduling and accumulator valve arrangement of the type above set forth and which is characterized by its implicity in construction and its minimum space requirements.

Further objects and features of my invention will become apparent from the following description and from the accompanying drawings wherein:

FIGURE 1 shows in schematic form a torque transmitting gear system for an automotive vehicle driveline. This system is capable of accommodating the improved control valve arrangement of my invention.

FIGURES 2a, 2b and 2c show in schematic form a valve system incorporating the improvements of my invention;

FIGURE 3 is an enlarged view of a portion of the valve system shown in FIGURE 2a;

FIGURE 4 is a chart illustrating the relationship between servo pressure for the intermediate speed-ratio brake servo and the engine intake manifold vacuum;

Figure 3:
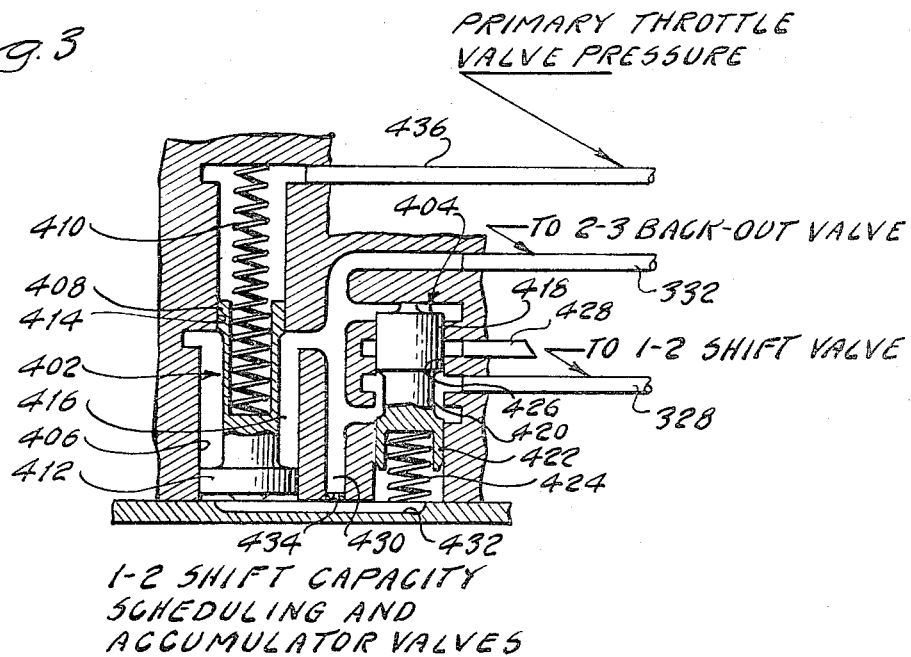

Referring first to FIGURE 1, numeral 10 designates a hydrokinetic torque converter unit which comprises an impeller 12, a turbine 14 and a stator 16. Each of these converter members is bladed and they are situated in toroidal, fluid flow relationship in a common torus circuit. Stator 16 changes the tangential component of the absolute fluid flow velocity vector of the fluid that leaves the turbine thereby creating a hydrokinetic torque reaction. This reaction is distributed to a portion of the housing 32 through an over-running coupling 34 and a stationary stator sleeve shaft 30. Coupling 34 inhibits rotation of the stator in a direction opposite to the direction of rotation of the turbine and the impeller, but freewheeling motion in the other direction is permitted when the converter acts as a fluid coupling.

The impeller 12 is connected by means of a drive shell 18 to the crankshaft 20 for an internal combustion vehicle engine 22. This engine includes an air-fuel intake manifold that is supplied with a combustible mixture by a carburetor 24. An engine carburetor throttle valve shown in part at 26 controls the flow of combustible mixture to the engine intake manifold.

A positive displacement fluid pump 28 is drivably connected to the impeller 18 and is effective to supply fluid pressure whenever the engine is operating. Pump 28 acts as a pressure source for the control system that will be described with reference of FIGURES 2a, 2b, 2c, 3 and 5.

The turbine 14 is connected to a turbine shaft 36 which in turn may be connected to a ring gear 40 for a first simple planetary gear unit 42. A selectively engageable forward clutch 38 is provided for the purpose of establishing and interrupting a connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for a direct and reverse clutch 50.

A brake band 52 surrounding the drum may be applied and released selectively by means of an intermediate servo shown in FIGURE 1 at 54. The servo includes a cylinder that receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred to the operating end of brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

A simple planetary gear unit 42 includes also a sun gear 66 which meshes with a set of planet pinions 68. These pinions are rotatably carried by a carrier 70 which is connected directly to a power output shaft 72.

Sun gear 66 forms also a part of a second simple planetary gear unit 74. This gear unit includes also a ring gear 76 and a set of planet pinions 78, the latter being journalled rotatably upon a carrier 80. Carrier 80, which defines a brake drum 82 about which is positioned a manual low and reverse brake band 84, can be adapted for accommodating driving torque reaction by means of an overrunning coupling having brake rollers 86. These rollers are disposed between an inner race that is common to the carrier 80, and the outer race 88, the latter being cammed to provide cam surfaces that cooperate with the rollers 86 to inhibit rotation of the carrier 80 in one direction although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being situated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined value, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

Brake band 84 is applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 102. The fluid pressure force acting upon the piston 98 is transferred to the operating end of the brake band 84 by means of a brake operating lever shown in part at 100. The other end of the brake band 84 is anchored to the housing as indicated.

The transmission mechanism may be conditioned for continuous operation in the lowest speed-ratio by appropriately adjusting a manual valve to the low speed-ratio position as will be explained subsequently. This causes fluid pressure to be distributed to the pressure chamber for the reverse and low servo. The forward clutch 38 is applied during operation in the forward drive range in any speed-ratio. If both the brake band 84 and the clutch 38 are applied, the turbine torque delivered to the turbine shaft 36 is distributed through the engaged forward clutch 38 to ring gear 40. The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overrunning brake shown in part at 86 and also by the engaged brake band 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed-ratio operation. Under these conditions, the brake band 84 is released while the clutch 38 remains applied. Clutch 50, of course, is released. The sun gear 66 functions as a reaction member during such intermediate speed-ratio operation, and the driving torque delivered to the ring gear 40 is multiplied by the first planetary gear unit 42. The over-all speed-ratio then is greater than the lowest speed-ratio, but it is less than unity. The overrunning coupling shown in part at 86 freewheels during such a speed-ratio change from the lowest speed-ratio to the intermediate speed-ratio.

To condition the mechanism for operation in the lowest speed-ratio during normal acceleration from a standing start, it is not necessary to apply brake band 84. The overrunning brake shown in part at 86 accommodates the forward acting torque; and upon application of the intermediate speed-ratio brake band 52 an automatic pick-up shift from the lowest speed-ratio to the highest speed-ratio is obtained. This is accomplished by the engagement of a single friction torque establishing device without the necessity for engaging or releasing a second friction torque establishing device.

A speed-ratio change from the intermediate speed-ratio to the direct drive, high speed-ratio is accomplished by releasing brake band 52 and applying both clutches 38 and 50 simultaneously. Brake band 52 is released by distributing pressure to the right-hand side of the piston 58. The brake band 52 is released when both pressure chambers of the intermediate servo are pressurized.

It will be seen, therefore, that the elements of the gear units will be caused to rotate in unison when both clutches are applied. A direct drive connection between shafts 36 and 72 then is provided.

Automatic speed-ratio changes can be accomplished in order to condition the driveline for various road conditions and for various operating demands. This is done by means of the automatic control valve system that now will be described.

The instant disclosure contains several several elements that are common to the copending application of John J. Searles, Ser. No. 401,356, which is assigned to the assignee of my invention. Reference may be had to this copending application for purposes of supplementing this disclosure.

Only a brief description of the valve elements that are common to the Searles disclosure will be presented as part of this disclosure. Referring first to FIGURE 2a, the engine driven front pump 28 receives its supply of oil through a supply passage 102, which communicates with the transmission sump that may be defined by the lower region of the transmission housing, and oil screen 104 is located in the sump at the intake end of the passage 102.

The high pressure side of the pump 28 communicates with the main line pressure passage 106.

A main regulator valve 108 maintains a controlled pressure level in the passage 106. It includes a movable valve element 110 having spaced valve lands 112, 114, 116 and 118. These lands are adapted to register with internal valve lands formed in a valve bore 120 which receives the valve element 110. The portion of the chamber 120 at the upper end of the land 118 is exhausted. Line pressure from passage 106 is distributed to the differential area defined by lands 118 and 116, thereby creating a pressure force that is opposed by the force of valve springs 122 and 124. Spring 122 is seated on the valve insert 126, which forms a part of a pressure booster valve 128. The region of the chamber 120 that is occupied by the springs 122 and 124 is exhausted as indicated.

As pressure in passage 106 begins to be developed when the pump 128 becomes operative, valve element 110 is urged in a downward direction to provide controlled communication between passage 106 and a low pressure oil return passage 130. Before land 114 uncovers the passage 130, however, land 112 uncovers converter fluid supply passage 132. Thus, the converter is filled during the initial stages of the pressure build-up in the control system. Once the land 114 establishes communication between passage 106 and passage 130, however, the element 110 begins to regulate the pressure in passage 106.

The pressure booster valve comprises a valve element 134 which has spaced valve lands 136, 138, and 140, each land being formed with a progressively decreasing diameter. The differential area defined by lands 136 and 138 communicates with a passage 142 which is pressurized, as will be explained subsequently, whenever the transmission mechanism is conditioned for reverse drive operation. The resulting pressure force acting on the element 134 thus augments the force of the valve springs for the main regulator valve to cause the main regulator valve to maintain a higher pressure level in the circuit than the corresponding pressure level that would exist during forward drive operation. The servos which must accommodate the increased driving torque under reverse driving conditions thus can be maintained at the proper pressure level to avoid slippage of the clutch and brake friction elements.

The lower area of land 140 is in communication with passage 144, which is subjected to an engine torque sensitive signal pressure during normal operation. The resulting pressure force acting upon the pressure booster valve supplements the spring force after the magnitude of the signal pressure reaches a predetermined value. After that value is reached the regulated line pressure maintained by the main regulator valve will be dependent upon engine torque, and for any magnitude of the signal pressure less than that predetermined value the pressure force acting upon the pressure booster valve will be insufficient to overcome the force of spring 124. The spring 124 yields, however, when the magnitude of the signal pressure in passage 144 exceeds the predetermined value.

A cut-back pressure passage 146 communicates with the differential area of lands 138 and 140. Passage 146 communicates with a so-called cut-back valve, which will be described subsequently, and it in turn communicates with the engine torque signal pressure source. The cut-back valve is road-speed sensitive, and at any road-speed less than a predetermined value, the cut-back valve causes passage 146 to become pressurized with the torque sensitive signal pressure.

Thus during acceleration from a standing start when the hydrokinetic torque ratio of the converter is at a maximum value, the available line pressure for any given engine throttle setting will be at a maximum value.

The regulated line pressure in passage 106 is distributed to the manual valve 148 through branch passages 150 and 152. The manual valve includes a movable valve element 154 which may be connected by means of a suitable linkage mechanism to a driver controlled selector lever. It is slidably situated within a valve chamber 156, which has formed thereon valve lands that register with cooperating valve lands on the element 154. These valve lands are identified by reference numerals 158, 160, 162, 164, 166, 168, 170 and 172. The space between lands 162 and 164 is in fluid communication with the space between lands 170 and 168.

An exhaust port 174 communicates with the valve chamber 156. Each end of the valve chamber 156 also forms an exhaust port.

The valve element 154 can be adjusted by the operator to any one of several operating positions. These are indicated by the symbols R, N, D2, D1 and L, which respectively identify the reverse position, the neutral position, the second drive range position, the first drive range position and the manual low drive position. Element 154 is shown in the drawings in the neutral position.

Fluid pressure is distributed by the manual valve to various regions of the control system through communicating passages 150, 152, 142, 176, 178, 180 and 182. Passage 178 communicates with a passage 184, which distributes line pressure to the secondary governor valve 93 of the governor valve assembly 90. Passage 184 also communicates directly with the forward clutch 38.

Passage 180 communicates with the 2-3 shift valve that will be described subsequently. It acts as a feed passage for the 2-3 shift valve. Passage 182 extends to the 1-2 shift valve and distributes to it a pressure that disables the 1-2 shift valve when operation on the D2 driving range is desired.

When the manual valve element 154 is shifted to the reverse drive position R, passages 178, 180 and 182 are exhausted through the left-hand end of the manual valve chamber 156 and passage 150 becomes blocked by land 162. Passage 152 is brought into communication with passage 176 through the space between lands 170 and 172 and the annulus formed at the location at which passage 176 communicates with the chamber 156. Passage 142 also becomes pressurized, as indicated earlier, since it is brought into communication with passage 176 through the space between lands 158 and 160.

When the manual valve element 154 is shifted to the D2 position, passage 150, which is subjected to line pressure, is brought into communication with passages 178, 180 and 182. Passages 176 and 142 become exhausted through exhaust port 174. Passage 152 becomes blocked by land 170. Passages 176 and 142 also become exhausted through the right-hand end of the valve chamber 156.

When the manual valve element 154 is shifted to the D1 position, passage 182 becomes exhausted through the left-hand end of the manual valve chamber 156. Passages 178 and 180 communicate with line pressure passages 150 and 152. Passages 142 and 176 become exhausted through the right-hand end of the manual valve chamber 156.

When the manual valve element 154 is shifted to the L position, both passages 180 and 182 become exhausted through the left-hand end of the valve chamber 156. Passage 152 communicates with passage 178 and also with passage 176. Passage 142 becomes exhausted through the right-hand end of the valve chamber 156.

The governor valve assembly 90, which acts as a vehicle speed sensitive pressure source, includes a valve body 186 which is carried by the power output shaft 72. It includes a pair of valve chambers situated on opposed sides of the shaft 72. One chamber 188 receives a primary governor valve element 92 and a second chamber 192 receives secondary governor valve element 93. This valve element 93 is formed with stepped diameter valve lands 196 and 198. Line pressure is distributed to the annular space between lands 198 and 196 thereby creating a pressure force on element 93 that tends to urge it radially inwardly. When this occurs, a governor pressure passage 200, which extends to speed sensitive portions of the valve system, is brought into communication with an exhaust port 202 formed in the valve body. At the same time, passage 184 is brought into communication with a cross-over passage 204 formed in the governor valve body 186. Land 198 is provided with a suitable flat to provide such communication when the element 93 is shifted radially inwardly.

Passage 204 communicates with the annular space between the valve lands 206 and 208 formed on the primary governor valve element 92. These lands, when the element 92 assumes the radially inward position shown, block communication between passage 204 and the exhaust region. Therefore, whenever the speed of shaft 72 is less than that speed that will cause the primary governor valve element to shift outwardly, the pressure signal in passage 200 will be zero. Modulation of pressure by the secondary governor valve element 93 will be prevented. At some predetermined speed, however, the spring force acting upon the primary governor valve element 92 will yield thereby allowing the element 92 to shift radially outwardly to establish communication between passage 204 and an exhaust port 210 formed in the valve body 186. When this occurs the pressure acting radially inwardly on the valve land 198 becomes exhausted thereby allowing the secondary governor valve element to modulate the pressure in passage 184 to produce a resultant pressure signal in passage 200. The magnitude of this signal is proportional to the speed of rotation of the shaft 72.

The engine torque sensitive pressure signal is obtained by a primary throttle valve shown at 212. It includes a valve element 214 having a pair of spaced lands 216 and 218. Element 214 is slidably disposed in throttle valve chamber 220. Control pressure is distributed to the valve chamber 220 through the passage 106. An exhaust port 222 communicates with the chamber 220 at a location adjacent land 218.

Chamber 220 is formed in a valve body 224 which is threaded at its end to accommodate a threaded vacuum diaphragm adapter 226. A vacuum servo housing, shown in part at 228, is secured to the adapter 226. The housing is secured to the margin of the flexible diaphragm 230, which cooperate with the housing to define a manifold pressure chamber 232. A diaphragm spring 234 which acts on the flexible diaphragm 230 is anchored against the housing 228. The chamber 232 is in communication with the air fuel mixture intake manifold of the internal combustion engine for the vehicle driveline. The manifold pressure passage 236 interconnects the chamber 232 with the engine manifold.

The left-hand side of the diaphragm 230 is subjected to atmospheric pressure. Thus the pressure forces are unbalanced, and the force of spring 234 causes the diaphragm 230 to deflect. The force acting on the diaphragm is transmitted to the valve element 214 through a valve stem 238.

The throttle valve output pressure passage 240 intersects the chamber 220 at a location intermediate the lands 216 and 218. A feed-back pressure passage 242 inter-connects passage 240 and the left-hand end of land 216. Thus it is apparent that the valve element 214 will modulate the pressure in passage 106 and produce a resultant pressure signal in passage 240 that is determined by the magnitude of the engine manifold pressure.

The throttle pressure signal in passage 240 is made available to passage 144, as explained previously, thereby providing a modification in the regulated line pressure that satisfies changing torque transmitting requirements as the engine intake manifold pressure changes. The throttle pressure in passage 240 is distributed also though a branch passage 244 to a throttle booster valve 246. That valve comprises a valve spool 248 having spaced lands 250 and 252.

Valve spool 248 is situated in a valve chamber 254 which has internal valve lands that register with the lands 250 and 252. A throttle pressure passage 256 intersects the chamber 254 at a location intermediate lands 250 and 252. Passage 244 intersects chamber 254 at a location adjacent land 252. It communicates also with the right-hand end of the land 252. Land 250 is smaller in diameter than land 252.

Line pressure from passage 106 is distributed through passage 258 to the valve chamber 254. Passage 258 intersects the chamber 254 at a location adjacent land 250. Valve element 248 is biased in a right-hand direction, as viewed in the drawings, by a valve spring 260.

The pressure in passage 244 will create a pressure force that tends to urge the valve element 248 in a left-hand direction. If that pressure force is insufficient to overcome the force of spring 260, direct communication is established between passage 244 and passage 256. If the pressure in passage 244 is greater than the pressure corresponding to that engine manifold pressure obtained for any given load when the engine carburetor throttle is at a medium setting, the spring 260 will begin to yield and the valve element 248 will begin to modulate the pressure in passage 258. As the pressure in passage 244 increases still further, the magnitude of the resultant pressure in passage 256 will be increased accordingly. The magnitude of the pressure in passage 256 therefore is an indicator of the engine torque demand as indicated by the engine throttle setting. Although the pressure in passage 144 will vary only slightly as the engine carburetor throttle is advanced from an intermediate setting toward a wide-open throttle position, the magnitude of the pressure in passage 256 will tend to vary to a significant and measurable degree. Thus the pressure in passage 256, unlike the pressure in passage 144, can be used as an indicator of engine torque demand. The pressure in passage 144, however, is useful as an indicator of engine torque as distinguished from torque demand. It is for this reason that passage 144 is used to distribute a torque sensitive signal to the regulator valve. Passage 256 on the other hand, extends to the 2–3 shift valve and the 1–2 shift valve, each of which will be explained subsequently, for the purpose of establishing the shift points and providing the necessary shift delay during upshifts as the vehicle is accelerated.

Passage 256, as indicated previously, extends to the 2–3 shift valve 262 which includes a multiple land valve element 264 having spaced valve lands 266, 268 and 270. Valve element 264 is slidably positioned within a valve chamber 272 having internal valve lands that cooperate with the lands of element 264. At the lower end of chamber 272 there is provided a throttle modulator valve 274 in the form of a single diameter valve element that registers with internal valve lands formed in the lower region of chamber 272. A valve spring 276 is situated between modulator valve 274 and valve element 264.

Passage 256 distributes throttle booster valve output pressure to the lower end of valve 274. When a minimum limiting pressure is obtained, spring 276 yields thereby establishing restricted communication between passage 256 and passage 278. The modulated pressure thus established in passage 278 is of lower magnitude than the pressure in passage 256.

This modulated pressure is distributed to the chamber 272 through feed-back passage 280.

A passage 282, which is exhausted during normal forward drive operation, communicates with the chamber 272 at a location adjacent the upper edge of valve 274.

The governor pressure passage 200 extends to the upper region of chamber 272 and distributes governor pressure to the upper surface of land 270. Thus a governor error pressure force opposes the modulated throttle valve pressure force and the spring force acting upon the element 264.

Line pressure is distributed from passage 180 to the valve chamber 272 at a location adjacent land 266 and also at a location intermediate lands 270 and 268. Land 268 is slightly smaller in diameter than the land 270. Thus when the valve element 264 assumes the position shown, a slight hysteresis force acts upon element 264 to help maintain it in the upper position shown. This force is cancelled, however, when the element 264 moves in a downward direction since land 270 then blocks passage 180 at a location adjacent land 270. Passage 282, which is exhausted during operation in any of the forward drive ranges, communicates with the chamber 272 at a location intermediate lands 266 and 268. When the valve element 264 assumes the position shown, direct communication is established between passage 284 and servo feed passage 286. Passage 180 is pressurized whenever the manual valve assumes the D2 position or the D1 position.

If the vehicle speed reaches a sufficiently high valve for any given engine manifold pressure, the valve element 264 will shift downwardly thereby causing communication between the passage 180 and the passage 286. This communication takes place between the space defined by lands 264 and 266. At the same time passage 284 exhausts the differential area defined by lands 260 and 270. Communication between passage 286 and exhaust passage 284, of course, is interrupted. The transmission then is conditioned for an upshift from the intermediate speed-ratio to the direct drive, high speed-ratio as pressure is distributed through passage 286 to the reverse and direct clutch servo.

Passage 286 communicates with passage 64 to pressurize the reverse and direct clutch servo. The pressure in passage 286 is distributed also to an intermediate servo release pressure passage 288, which in turn extends to the release side of the intermediate brake band servo. The intermediate brake band servo piston thus moves to a brake releasing position notwithstanding the fact that the apply side of the intermediate servo is pressurized at this time.

Communication between passage 288 and passage 286 is established by means of a flow restricting orifice 290 and by a 3–2 coast control valve 292. The 3–2 coast control valve includes a valve element 294 situated within the valve chamber 296. It is formed with two valve lands 298 and 300. A valve spring 302 normally urges the element 294 in a downward position, as viewed in the drawings. The governor pressure from passage 200 acts upon the lower end of land 300. When the vehicle speed is sufficiently high, the governor pressure is effective to maintain free communication between passages 288 and 286. Thus the 3–2 coast control valve has no influence on the rate of application of the intermediate speed brake at these higher vehicle speeds. If the vehicle speed is low, however, the spring 302 will urge the valve element 294 in a downward direction. In this case the restricted passage 290 provides the only fluid communication between passages 288 and 286. A coasting downshift in the D2 drive range from the high speed range to low speed range thus is characterized by reduced rate of application of the intermediate speed-ratio brake band. During coasting operation in the D2 drive range the transmission normally will tend to assume a downshift condition, but the application of the intermediate brake band is delayed and cushioned under these conditions to prevent an undesirable harshness.

Passage 176 is pressurized only when the manual valve assumes the L position or the R position. Under these conditions the pressure is distributed through the 1–2 shift valve to a passage 304, which in turn communicates with a low speed brake servo feed passage 306.

The 1–2 shift valve comprises a valve spool 308 having spaced valve lands 310, 312, 314, 316, 318, 320 and 322. Lands 320 and 322 are located on the valve element portion that is separated from the portion on which lands 312, 314, 316 and 318 are formed. The region between the two valve element portions is in communication with passage 182 which is pressurized, as mentioned earlier, when the manual valve assumes the D2 position. If for any reason the manual valve is miscalibrated or if the valve tolerances are such that leakage will occur across the valve lands between passages 180 and 182 when the driver has shifted the manual valve to the D1 position, the resulting pressure build-up in passage 182 will cause the lower portion of the valve element 308 to separate from the upper portion thereof thereby causing the lower portion of the valve element 308 to assume the intermediate speed-ratio position. Thus full line pressure can be aplied to the intermediate servo to establish definitely the intermediate speed-ratio condition. Partial application of the intermediate servo is avoided.

Passage 184, which pressurizes the forward clutch 38, communicates with the valve chamber 324 within which the 1–2 shift valve element 308 is situated. Chamber 324 is formed with internal valve lands that register with the lands 312, 314, 316, 318, 320 and 322. Communication between chamber 324 and passage 184 takes place adjacent land 312. This land is slightly larger in diameter than land 310.

Element 308 is biased in an upward direction by a valve spring 326. The lower end of the chamber 324 is exhausted except when the manual valve is moved to the reverse or low positions. When the element 308 assumes the position shown, passages 304 and 306 are exhausted through passage 176 and through the exhaust opening in the manual valve.

The line pressure in passage 184 acts upon the differential area of lands 310 and 312 when the element 308 assumes the position shown thereby tending to hold it in that position. When the governor pressure for any given manifold pressure exceeds a predetermined amount, valve element 308 will be shifted in a downward direction thereby establishing communication between passage 184 and a passage 328, which communicates with the valve chamber 324 at a location intermediate lands 312 and 314. Land 314 covers an exhaust port 330 upon downward movement of the element 308. The exhaust port 330 is located adjacent land 314 and it is in communication with passage 328 when the element 308 is in the position shown. When the element 308 moves downwardly, however, passage 304 communicates with exhaust port 330 as land 316 blocks passage 176.

When passage 328 becomes pressurized upon movement of element 308 in a downward direction, pressure is distributed through the 1–2 shift capacity scheduling and accumulator valves, shown in FIGURE 3, to a passage 332. This passage in turn extends to a 2–3 backout valve 334. The latter establishes communication between passage 332 and a passage 336, which extends to the apply side of the intermediate servo.

During acceleration from a standing start the driving torque reaction is accommodated by the overrunning couplings shown in part at 86. After a predetermined vehicle speed is reached for any given manifold pressure, the 1–2 shift valve will move to the upshift position thereby causing pressure distribution to occur from passage 184 to passage 328. This applies the intermediate servo. This action occurs, of course, only when the manual valve is in the D1 position. If the manual valve is moved to the D2 position, passage 182 becomes pressurized immediately thereby causing the valve element 308 to move to the intermediate speed-ratio position. The vehicle then accelerates from a standing start in the intermediate speed-ratio. Upon a subsequent upshift to the high speed-ratio as the vehicle continues to accelerate, the 2–3 shift valve will move thereby causing pressure distribution to occur between passage 180 and passage 286, as explained previously. The release side of the intermediate servo becomes pressurized simultaneously with the application of the reverse and direct clutch.

The 2–3 backout valve cushions the application of the reverse and direct clutch when an upshift occurs under minimum engine throttle conditions. Normal application of the reverse and direct clutch upon a 2–3 upshift during the acceleration period, the 2–3 backout valve provides continuous communication between passages 332 and 336.

The 2–3 backout valve includes a valve spool 338 having spaced valve lands 340 and 342. It is biased in an upward direction as seen in the drawings by valve spring 344. The upper end of land 340 is subjected to the pressure that exists in the reverse and direct clutch, a suitable passage 346 being provided for this purpose. Valve element 338 is slidably situated within a backout valve chamber 348. The portion of this chamber that is occupied by spring 344 communicates by means of passage 350 with the throttle pressure line 240. During a normal 2–3 upshift as the vehicle accelerates under torque, the throttle pressure force and the spring force are sufficient to maintain the valve element 338 in the position shown until the reverse and direct clutch becomes fully engaged and the intermediate servo becomes fully released. If the 2–3 shift occurs, however, when the engine manifold pressure is low—for example, during closed throttle, coasting conditions—the pressure build-up in the reverse and direct clutch following an upshift of the 2–3 shift valve causes the valve element 338 to shift downwardly at a time prior to the time that the so-called end-point of the servo is reached.

Initial pressure build-up in the reverse and drive clutch will cause element 338 to shift in a downward direction thereby establishing communication between the passage 346 and the passage 336. Thus the 2–3 backout valve connects the reverse and direct clutch servo chamber with the apply side of the intermediate servo. This allows the servo end-point to be reached at a time prior to the final engagement of the reverse and drive clutch. This eliminates simultaneous application of the servo and the clutch, and hence it eliminates the harshness of the 2–3 upshift under such minimum torque conditions.

Since it is essential to prevent loss of pressure from the reverse and drive clutch through the backout valve when the transmission mechanism is conditioned for low speed operation, the manual low valve 352 is provided. This valve comprises a single diameter valve element that is moved into engagement with the 2–3 backout valve element 338 whenever passage 354 is pressurized. This passage is pressurized whenever the manual valve is moved to the low speed range position. If the manual valve is moved into the low speed range position while the element 338 is in a downward position, the end-point at which a coasting 3–2 downshift would occur would be dependent upon the calibration of a 2–3 backout valve. A delay in the application of the intermediate servo then would be undesirable. The manual low valve prevents this from happening.

A cut-back valve 356 is provided to allow the line pressure to be reduced following initial acceleration from a standing start when the hydrokinetic torque ratio of the converter has become reduced. This occurs at a time prior to the operation of the shift valves. Thus the servo does not have excessive capacity at the time the 1–2 shift and the 2–3 shift occur and the quality of the shifts thus is improved. A maximum line pressure is required only when the maximum torque delivery requirements are present. This occurs only when the hydrokinetic torque ratio is at a relatively high value.

The cut-back valve includes the valve spool 358 which is slidably situated within a valve chamber 360. The spool 358 includes valve lands 362 and 364. Land 362 includes a large diameter portion that is greater in diameter than diameter of valve land 364. Thus, a differential area is provided, and this area is subjected to the output throttle pressure of the primary throttle valve 212.

Throttle pressure is distributed to the valve chamber 360 through a throttle pressure passage 366. The valve spool 358 is caused to assume the position shown on the drawings when the vehicle speed is low. Under these conditions, the passage of 366 is brought into direct communication with passage 368 which in turn communicates with the passage 146 and the pressure booster valve 128. The lower end of chamber 360 is exhausted. Governor pressure in passage 200 acts upon the upper end of land 362. When the vehicle speed is sufficiently high, the governor pressure force moves the spool 358 downwardly against the opposing influence of throttle pressure thereby interrupting communication between passage 366 and exhausting passage 368 through the exhaust port 370.

A forced downshift valve 372 is provided for overruling the automatic operation of the shift valves. It includes a valve spool 374 having lands 376 and 378. Spool 374 is slidably situated within a valve chamber 380 and is urged in a left-hand direction by valve spring 382.

The downshift valve is connected mechanically to the engine carburetor throttle valve. When the operator moves the engine carburetor throttle valve toward the wide open position, the throttle linkage will cause the spool 374 to be shifted in a right-hand direction thereby establishing communication between passage 282 and a passage 384, the latter communicating with throttle booster valve output pressure passage 256. At the same time, communication between passage 282 and exhaust port 386 is interrupted. The output pressure of throttle booster valve 246 then acts directly upon each of the shift valves to urge them toward their respective downshift positions.

It is desirable to avoid a reduction in line pressure when the vehicle is coasting with the engine carburetor throttle at its minimum setting since the clutch and brake friction elements should have sufficient capacity to accommodate the coasting torque. For this reason there is provided in this system a line pressure coasting boost valve 388 which functions to augment the line pressure under coasting conditions at high vehicle speeds. It includes a valve element 390 that is situated within a valve chamber 392. It includes valve lands 394 and 396. Valve element 390 is biased normally in an upward direction as viewed in the drawings by a valve spring 398. When it is in this position, passage 368 communicates directly with passage 146. Both passages 146 and 368 are exhausted when the cut-back valve moves to the downward position as the vehicle speed is increased following a standing start. This provides a line pressure cut-back as explained previously.

Governor pressure in passage 200 is distributed to the upper end of land 394. Throttle pressure from the primary throttle valve output pressure passages 240 and 144 acts upon the lower end of land 396 to supplement the force of spring 398. As long as throttle pressure is present in passage 144, valve element 390 will assume the position shown. If the vehicle is coasting with a minimum engine throttle setting and if the vehicle speed is high, the governor pressure in passage 200 will be sufficient to move the valve element 390 in a downward direction thereby establishing communication between passage 146 and a line pressure passage 400, the latter communicating directly with passage 176, which is a feed passage for the 1–2 shift valve. Thus line pressure is made available to boost the regulated pressure in the system to maintain adequate torque transmitting capacity in the friction clutch and brake elements.

The 1–2 shift valve and the 2–3 shift valve respond to the vehicle speed pressure signal and the pressure signal on the output side of the throttle booster valve to initiate automatic upshifts during the acceleration period, as explained in the foregoing paragraphs. When the transmission is in the D1 driving range, a 1–2 upshift is accomplished by engaging the intermediate servo as the carrier 80 begins to freewheel. There is no requirement that any of the other friction elements be applied or released. It is desirable, therefore, to cushion the application of the intermediate servo during such a 1–2 upshift in order to improve the 1–2 upshift quality. This is accomplished by means of the 1–2 shift capacity scheduling and accumulator valves which are best seen in FIGURE 3. For purposes of this description, these valves will be separately identified as a modifier valve 402 and a shift regulator valve 404.

The modifier valve comprises a valve chamber 406 within which is slidably positioned a valve element 408. This element is urged normally in a downward direction, as viewed in the drawings, by a valve spring 410. It includes a large diameter land 412 and a relatively small diameter land 414. Each land is situated within a separate portion of the chamber 406. The lower region of the chamber 406 and the element 408 cooperate to define an accumulator cavity 416. This cavity is in fluid communication with passage 332 which extends, as previously explained, through the 2–3 backout valve to the apply side of the intermediate servo. This servo, as we have seen, is stroked from a release position to the applied position during a 1–2 upshift while the release side of the servo remains exhausted. The pressure in the apply side of the intermediate servo is distributed through passage 332 to the upper end of a valve land 418 for the regulator valve 404. This valve includes a valve element 420, and it includes also, in addition to land 418, the land 422. Element 420 is biased in an upward direction, as viewed in FIGURE 3, by a valve spring 424.

Valve element 420 is slidably situated within a valve chamber 426, which is formed with internal valve lands that register with the lands 418 and 422. An exhaust port 428 communicates with the chamber 426 at a location adjacent land 418.

Passage 332 communicates with a passage 430 which in turn is in fluid communication with a passage 432 through a flow restricting orifice 434. Passage 432 in turn distributes the pressure on the downstream side of the orifice 434 to the lower end of land 422 of the regulator valve element 420 and to the lower end of land 412 of the modifier valve element 408.

When the regulator valve element 420 is in the position shown at FIGURE 3, direct communication is established between passage 328 and passage 430. Passage 328, as explained in the preceding portion of this description, is exhausted through passage 330 when the 1–2 shift valve is in the downshift position. It is pressurized, however, when a 1–2 shift valve moves to the upshift position. Thus, when an upshift occurs following acceleration from a standing start, a pressure build-up tends to occur in passage 430 and in passage 332. This same pressure build-up creates a pressure force acting upon the upper end of land 418. Of course, this same pressure build-up occurs on the lower end of land 422 and on the lower end of land 412.

The upper end of valve chamber 406 is pressurized with the output pressure of the primary throttle valve. Passage 436 is provided for the purpose of distributing valve pressure from passage 144 to the upper region of chamber 406.

The force of spring 410 and the force of the throttle pressure acting upon the modifier valve element 408 tends to oppose movement of the element 408 under the influence of the pressure build-up on the lower end of land 412. When the pressure build-up reaches a value that is sufficient to overcome the combined downwardly directed forces acting upon the element 408, that element will begin to stroke in an upward direction. This causes flow to occur across the orifice 434. This produces a pressure differential, which may be approximately 5 p.s.i. This pressure differential then tends to cause valve element 420 to shift in a downward direction thereby uncovering exhaust port 428 to create a pressure build-up in the passage 432 following movement of the 1-2 shift valve to the upshift position. The action of the servo then is modified so that the pressure build-up occurs at a slower rate than that which would occur if the regulator valve were not present.

As the pressure continues to build up at the slower rate, the pressure in the accumulator chamber 416 also builds up at that same rate. This is accompanied, of course, by a corresponding pressure build-up in passage 432, although the absolute pressure in that passage will be less than the pressure that exists in chamber 416 by reason of the pressure drop across the orifice 434. The valve element 408 then will continue to stroke until it bottoms out against the end of the chamber 406. At that time, flow ceases across the orifice 434 and the pressure in passage 432 becomes equal to the pressure in passage 430. The spring 424 then returns regulator valve element 420 to the position shown in FIGURE 3 thereby closing exhaust port 428. The intermediate servo then will have been engaged fully so that it is capable of transmitting the maximum torque reaction. The shift then is completed.

It is seen from the foregoing description that the servo pressure at which the regulator valve 420 begins to regulate is dependent upon the magnitude of the throttle pressure in passage 436. If a 1-2 upshift occurs when the engine manifold pressure is high, there will take place an immediate pressure build-up to a relatively high value before the regulator valve 420 begins to modify the rate of pressure build-up. During this interval, the intermediate servo gains capacity although it continues slipping since it has not yet achieved its full torque transmitting capacity.

Figure 5:
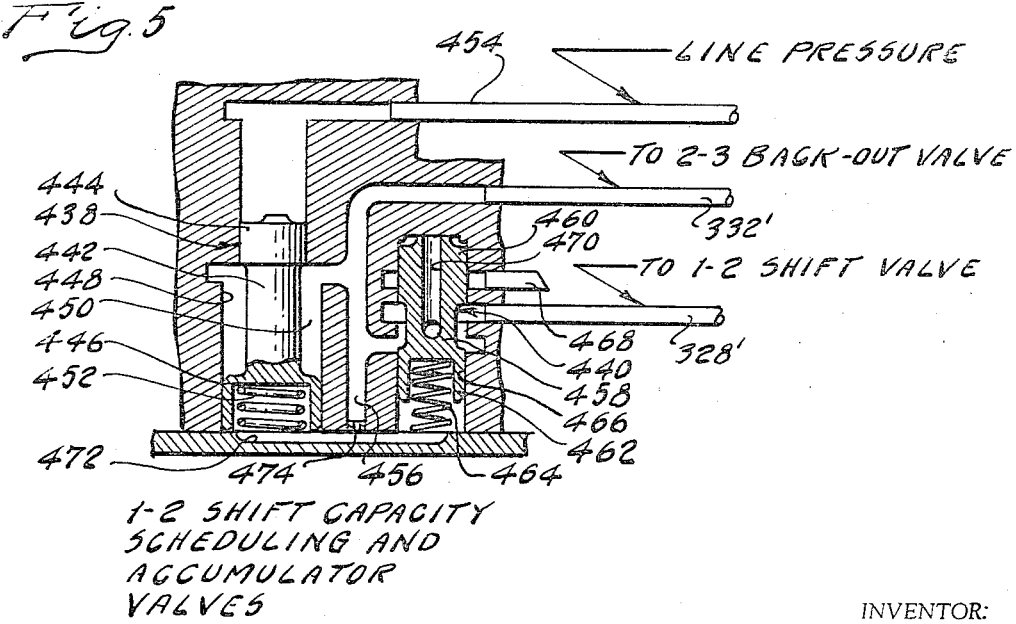
FIGURE 5 shows a portion of an alternate valve system capable of being embodied in the controls of FIGURES 2a, 2b and 2c.

The alternate arrangement of FIGURE 5 includes a modifier valve 438 and a regulator valve 440. Valve 438 includes an element 442 having spaced lands 444 and 446 that are slidably situated within a valve chamber 448 having a lower portion of large diameter and an upper portion of smaller diameter. The lower portion of chamber 448 cooperates with the element 442 to define an accumulator cavity 450. An accumulator spring 452 is situated between the lower end of the chamber 448 and the element 442. The upper smaller diameter end of the chamber 448 communicates with a line pressure passage 454 which may be in direct communication with passage 106. When the arrangement of FIGURE 5 is used in the system described with reference to the other figures, passage 454 then is subjected at all times to regulated line pressure rather than throttle pressure. Regulated line pressure, of course, is indirectly responsive to changes in throttle pressure as determined by the magnitude of the engine intake manifold pressure.

The accumulator cavity 450 is in fluid communication with a passage 456 which extends to a passage 332'. This passage corresponds to passage 332 in the circuit described with reference to the other figures. It communicates with the apply side of the intermediate servo passage 328' which may correspond to the passage 328 described with reference to the other figures.

Passage 328' communicates with passage 456 through the regulator valve 440. This valve comprises a valve element 458 having spaced lands 460 and 462. Element 458 is biased normally in an upward direction, as viewed in FIGURE 5, by valve spring 464. Valve element 458 is situated slidably within a valve chamber 466. An exhaust port 468 communicates with valve chamber 466 at a location adjacent land 460. A pressure distributor passage 470 interconnects the upper region of chamber 466 with the annular space defined by lands 460 and 462. Thus the upper end of land 460 is subjected to the pressure that exists in passage 328' when the element 458 assumes the position shown in FIGURE 5.

Passage 456 communicates with a passage 472 through a flow restricting orifice 474. Passage 472 in turn communicates with a lower end of land 462 and the lower end of land 446.

The mode of operation of the arrangement of FIGURE 5 is similar to that of FIGURE 3 in most respects. When the 1-2 shift valve is moved to the upshift position following acceleration from a standing start, pressure is distributed from passage 328' through the valve chamber 466 to chamber 456. A pressure build-up then tends to occur in passage 456 and in the communicating passage 332', which extends to the intermediate servo. That same pressure build-up occurs, of course, on the lower end of land 462 and on the lower end of land 452. When the magnitude of the pressure in passage 472 and the force of spring 452 is sufficient to overcome the opposing influence of line pressure acting upon land 444 and servo pressure in the accumulator chamber 450, valve element 442 will tend to shift in an upward direction as viewed in FIGURE 5. This then immediately causes a pressure unbalance by reason of the pressure drop across the orifice 474. This pressure drop tends to actuate the regulator valve element 458 and provide restricted communication between passage 456 and exhaust port 468.

The modifier valve and the associated regulator valve can be calibrated so that the intermediate servo will become fully engaged at all times at a time later than the point at which the regulator valve element 420 begins to regulate but at a time prior to the instant that the modifier valve element 408 becomes bottomed out against the end of the valve chamber 406. Thus the intermediate servo becomes applied at an instant when the rate of pressure build-up on the apply side of the servo is reduced. This occurs regardless of the magnitude of the engine manifold pressure that exists at the time the 1-2 upshift is initiated.

In FIGURE 4 are illustrated the relationship between manifold pressure, as measured in inches of mercury, and the servo pressure on the apply side of the intermediate servo during a shift interval. Line A represents the variation between manifold pressure and primary throttle valve output pressure. Line B represents the regulated line pressure that is maintained by the main regulator valve. As we have seen earlier, variations in the magnitude of the throttle pressure in passage 240 and in passage 144 have no influence on the magnitude of the regulator pressure level until the magnitude of the throttle pressure reaches a minimum value that is sufficient to overcome the opposing influence of the valve spring 124. In the chart of FIGURE 4, it is seen that this minimum throttle pressure is that pressure that exists when the manifold pressure is approximately seventeen inches of merucy. As the throttle pressure is varied in value beyond that minimum value, the line pressure changes linearly as indicated in FIGURE 4.

Line C in FIGURE 4 represents the initial pressure that is made available to the apply side of the intermediate servo before the regulator valve element 420 begins to regulate. As we have seen earlier, this regulation point is not reached until the modifier valve element 408 begins to stroke. That point in turn is dependent upon the magnitude of the throttle pressure in passage 436. Thus the initial servo pressure will vary linearly with manifold pressure as indicated in FIGURE 4.

As soon as the initial servo pressure is reached when the engine is operating with any given manifold pressure, the modifier valve element 408 will begin to stroke and the servo pressure will vary along a vertical line in FIGURE 4 until it reaches a point represented by the Line B. At some value of pressure between Line C and Line B, the intermediate servo will become fully applied.

Figure 6:
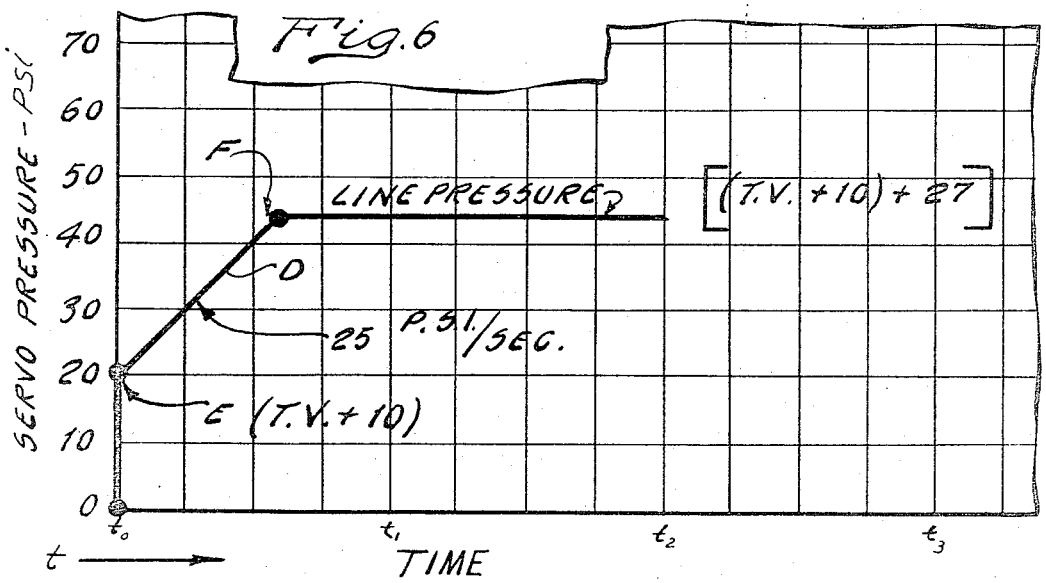
FIGURE 6 is a plot of the intermediate servo pressure variations that occur during the interval of a shift from the low speed-ratio to the intermediate speed-ratio.

In FIGURE 6 I have illustrated the relationship between time and servo pressure on the intermediate servo. The origin for the time axis in FIGURE 6 is the time at which the 1-2 shift valve moves to the upshift position. It is apparent that the servo pressure will begin to rise very rapidly along a line that will have a slope that is substantially vertical. If the throttle pressure at that instant is zero, the 1–2 upshift will occur. When the pressure in passage 332 reaches a value of approximately 10 p.s.i., the rate of pressure build-up in passage 332 then will decrease as indicated by Line D in FIGURE 6. This decrease in slope of the pressure build-up line in FIGURE 6 is due to the action of the regulator valve 420 as explained previously. The pressure will continue to build-up at the reduced rate along Line D until an increase of about 27 p.s.i. has been achieved. At that time, the magnitude of the pressure will become equal to line pressure. That value will be 37 p.s.i.

If the engine manifold pressure is greater than zero during a 1–2 upshift, the pressure build-up lines shown in FIGURE 6 will rise vertically, although their slopes will remain the same. For this reason, the first breakpoint E shown in FIGURE 6 is represented by the value of TV plus 10. The second breakpoint F can be represented by the value TV plus 10 plus 27 where TV is equal to the throttle valve pressure in passage 436.

The characteristics of the alternate 1–2 shift capacity scheduling and accumulator valve arrangement of FIGURE 5 are similar to that shown in FIGURE 6. The 1–2 shift will be completed when the magnitude of the servo pressure reaches some value that is less than the maximum pressure but which is greater than the pressure at which the initial breakpoint in the pressure build-up curve occurs. As in the previous embodiment, the shift occurs when the rate of pressure build-up is at a reduced value.

This modified pressure build-up is continuous until the valve element 442 bottoms out against the end of the valve chamber 448.

Figure 7:
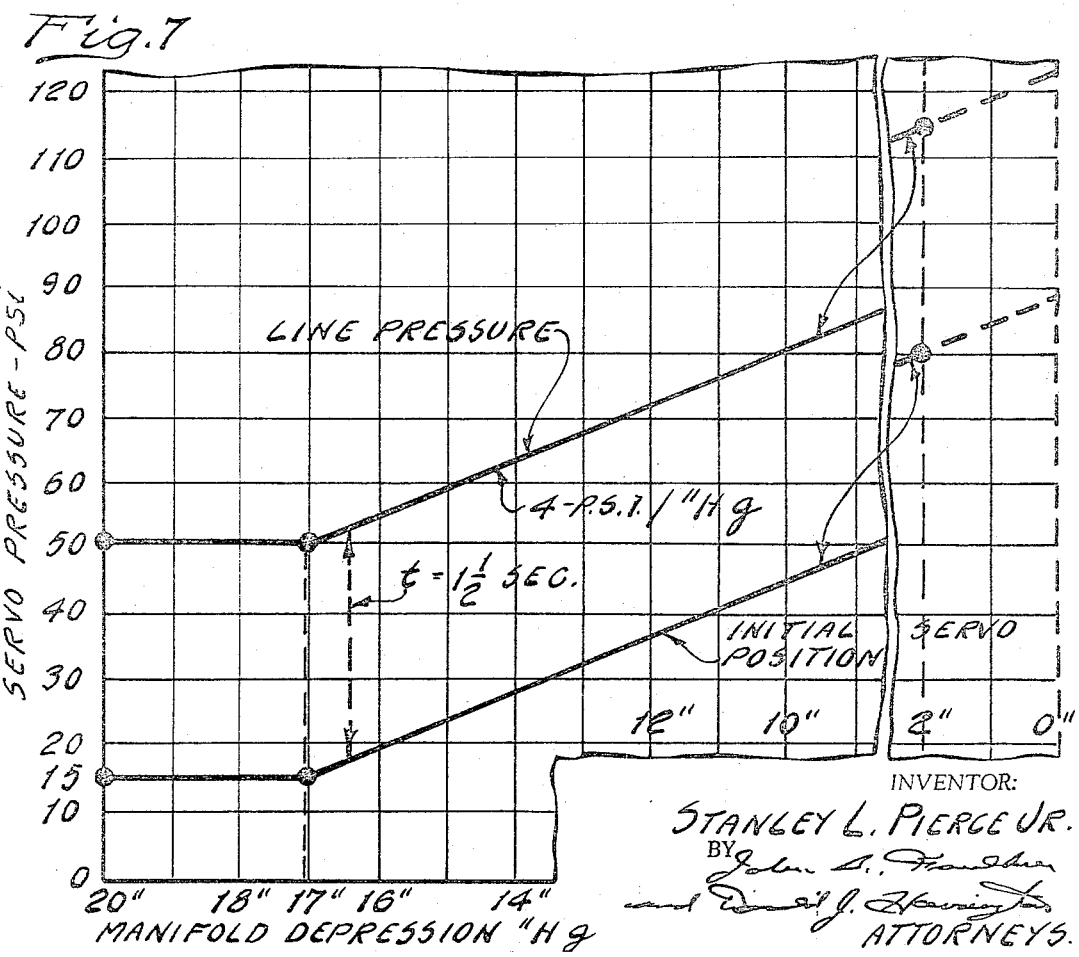
FIGURE 7 is a plot that corresponds to the plot of FIGURE 4 although it shows the characteristics of the alternative valve system of FIGURE 5 rather than the valve system of FIGURES 2a and 3.

In FIGURE 7 I have illustrated the relationship between engine manifold pressure and the pressure in the apply side of the intermediate servo. The 1–2 shift capacity scheduling and accumulator valves of FIGURE 5 do not influence the pressure build-up in the arrangement until a manifold pressure of 17 inches of mercury is achieved. Thus the left-hand portion of the initial servo pressure line in FIGURE 7 is horizontal. This characteristic, as explained previously, is due to the action of the pressure booster valve spring which causes the booster valve element to remain seated and inactive until the force of the booster valve spring in overcome. Thereafter increases in the magnitude of the manifold pressure will cause changes in the throttle pressure which will cause in turn a response by the main regulator valve. When the initial servo pressure for any given manifold pressure, as shown in FIGURE 7, is reached, the regulator valve 458 will begin to regulate. This then will cause a change in the servo pressure until when it reaches a value represented by the upper line in FIGURE 7. During a transition from initial servo pressure line to the upper pressure line in FIGURE 7, the modifier valve element 442 is stroked.

Having described preferred embodiments of my invention, what I claim and desire to secure by United States Letters Patent is:

1. In an automatic power transmission system having gear elements adapted to form a driving connection between a driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice.

2. A control system for a multiple speed-ratio power transmission mechanism comprising a fluid pressure operated servo adapted to control the relative motion of torque transmitting elements of said mechanism whereby speed-ratio changes can be accomplished, a fluid pressure source, conduit structure interconnecting said source and said servo, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, and an accumulator valve chamber receiving said piston and cooperating therewith to define an accumulator pressure cavity, said chamber being in fluid communication with said servo and with one portion of said regulator valve element, said chamber being in restricted fluid communication with another portion of said regulator valve element and with the other side of said accumulator piston, said regulator valve element being subjected to the fluid pressure differential that exists due to flow from one side of said accumulator piston to the other as the latter is stroked.

3. In an automatic power transmission system having gear elements adapted to form a driving connection between a driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, fluid pressure regulator valve mean in said conduit structure for maintaining a controlled, effective pressure in said conduit structure and an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice, a source of a fluid pressure signal that is proportional in magnitude to the torque delivery requirements of said system, and a fluid connection between said signal source and said modifier valve means for modifying the regulating characteristics of the latter as the torque delivery requirements change.

4. A control system for a multiple speed-ratio power transmission mechanism comprising a fluid pressure operated servo adapted to control the relative motion of torque transmitting elements of said mechanism whereby speed-ratio changes can be accomplished, a fluid pressure source, conduit structure interconnecting said source and said servo, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, and an accumulator valve chamber receiving said piston and cooperating therewith to define an accumulator pressure cavity, said chamber being in fluid communication with said servo and with one portion of said regulator valve element, said chamber being in restricted fluid communication with another portion of said regulator valve element and with the other side of said accumulator piston, said regulator valve element being subjected to the fluid pressure differential that exists due to flow from one side of said accumulator piston to the other as the latter is stroked, a source of a pressure signal that is proportional in magnitude to the torque delivery requirements of said mechanism, and a fluid connection between said signal source and said modifier valve means for modifying the regulating characteristics of the latter as the torque delivery requirements change.

5. In an automatic power transmission system having gear elements adapted to form a driving connection between a driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, and an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice, valve means in fluid communication with said source for establishing a regulated pressure that is proportional in magnitude to the torque delivery requirements of said system, and means for distributing said last-named pressure from said valve means to said accumulator piston to resist movement of the latter.

6. A control system for a multiple speed-ratio power transmission mechanism comprising a fluid pressure operated servo adapted to control the relative motion of torque transmitting elements of said mechanism whereby speed-ratio changes can be accomplished, a fluid pressure source, conduit structure interconnecting said source and said servo, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, an accumulator valve chamber receiving said piston and cooperating therewith to define an accumulator pressure cavity, said chamber being in fluid communication with said servo and with one portion of said regulator valve element, said accumulator chamber being in restricted fluid communication with another portion of said regulator valve element and with the other side of said accumulator piston, said regulator valve element being subjected to the fluid pressure differential that exists due to flow from one side of said accumulator piston to the other as the latter is stroked, valve means in fluid communication with said source for establishing a regulated pressure that is proportional in magnitude to the torque delivery requirements of said mechanism, and means for distributing said last-named pressure to said accumulator piston to resist movement of the latter.

7. In an automatic power transmission system having gear elements adapted to form a driving connection between a driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, main fluid pressure regulator valve means in said conduit structure for maintaining a controlled, effective pressure in said conduit structure and an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice, a source of a fluid pressure signal that is proportional in magnitude to the torque delivery requirements of said system, a fluid connection between said signal source and said main regulator valve means for modifying the regulating characteristics of the latter as the torque delivery requirements change, and means for distributing the regulated pressure from said main regulator valve means to said accumulator piston to urge the latter in one direction and to resist stroking thereof upon a pressure build-up in said servo.

8. A control system for a multiple speed-ratio power transmission mechanism comprising a fluid pressure operated servo adapted to control the relative motion of torque transmitting elements of said mechanism whereby speed-ratio changes can be accomplished, a fluid pressure source, conduit structure interconnecting said source and said servo, a main regulator valve means communicating with said conduit structure for maintaining a regulated pressure therein, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, an accumulator valve chamber receiving said piston and cooperating therewith to define an accumulator pressure cavity, said chamber being in fluid communication with said servo and with one portion of said regulator valve element, said chamber being in restricted fluid communication with another portion of said regulator valve element and with the other side of said accumulator piston, said regulator valve element being subjected to the fluid pressure differential that exists due to flow from one side of said accumulator piston to the other as the latter is stroked, a source of a pressure signal that is proportional in magnitude to the torque delivery requirements of said mechanism, and a fluid connection between said signal source and said main regulator valve means for modifying the regulating characteristics of the latter as the torque delivery requirements change, and means for distributing regulated pressure from said main regulator valve means to said accumulator piston to urge the latter in one direction and to resist stroking thereof upon a pressure build-up in said servo.

9. In an automatic power transmission system having gear elements adapted to form a driving connection between a driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice, a source of a fluid pressure signal that is proportional in magnitude to the torque applied to said driving member and a hydraulic connection between said signal source and said accumulator piston whereby a force on the latter is created that tends to resist movement thereof upon a pressure increase in said servo.

10. A control system for a multiple speed-ratio power transmission mechanism comprising a fluid pressure operated servo adapted to control the relative motion of torque transmitting elements of said mechanism whereby speed-ratio changes can be accomplished, a fluid pressure source, conduit structure interconnecting said source and said servo, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, an accumulator valve chamber receiving said piston and cooperating therewith to define an accumulator pressure cavity, said chamber being in fluid communication with said servo and with one portion of said regulator valve element, said chamber being in restricted fluid communication with another portion of said regulator valve element and with the other side of said accumulator piston, said regulator valve element being subjected to the fluid pressure differential that exists due to flow from one side of said accumulator piston to the other as the latter is stroked, a source of a fluid pressure signal that is proportional in magnitude to the torque applied to said driving member and a hydraulic connection between said signal source and said accumulator piston whereby a force on the latter is created that tends to resist stroking thereof upon a pressure increase in said servo.

11. In a torque delivery driveline having an internal combustion engine with an air-fuel mixture intake manifold, an automatic power transmission system having gear elements adapted to form a driving connection between the driving member and a driven member, means including a fluid friction torque establishing device for controlling the relative motion of the gear elements of said system to establish speed-ratio changes, a fluid pressure operated servo connected to a pressure operated part of said friction torque establishing device for actuating the same, a fluid pressure source, conduit structure interconnecting said source and said servo, an accumulator valve system adapted to cushion the rate of application of said servo as fluid pressure is distributed thereto, said accumulator valve system comprising a pressure regulator valve means for varying the magnitude of the pressure made available to said servo, a modifier valve means for changing the pressure regulating characteristics of said regulator valve means including a movable accumulator piston, one side of the piston being in fluid communication with said servo, a flow restricting orifice having one side thereof in fluid communication with said servo and the other side thereof in fluid communication with the other side of said piston, and passage means for distributing to said regulator valve means the pressure differential that exists across said orifice, a source of a pressure signal that is proportional in magnitude to the engine intake manifod pressure, and a hydraulic connection between said signal source and said accumulator piston whereby a pressure force is established on the latter that tends to oppose the stroking movement thereof upon a pressure increase in said servo.

12. In a torque delivery driveline having an internal combustion engine with an air-fuel mixture intake manifold, a control system comprising a fluid pressure operated servo adapted to control the relative motion of torque transmitting elements of said driveline whereby speed-ratio changes can be accomplished, a fluid pressure source, conduit structure interconnecting said source and said servo, a regulator valve means for controlling the rate of pressure build-up in said servo as fluid pressure is distributed thereto, said regulator valve means comprising a valve chamber in fluid communication with said servo and a regulating valve element situated in said chamber with one portion thereof being subjected to the pressure in said servo, an exhaust port in said valve chamber, a pressure supply port in said valve chamber for receiving the effective pressure of said source, means for normally urging said regulator valve element in one direction whereby said exhaust port is blocked and said pressure supply port is opened, a modifier valve means in fluid communication with said regulator valve means and comprising an accumulator piston, an accumulator valve chamber receiving said piston and cooperating therewith to define an accumulator pressure cavity, said chamber being in fluid communication with said servo and with one portion of said regulator valve element, said chamber being in restricted fluid communication with another portion of said regulator valve element and with the other side of said accumulator piston, said regulator valve element being subjected to the fluid pressure differential that exists due to flow from one side of said accumulator piston to the other as the latter is stroked, a source of a pressure signal that is proportional in magnitude to the engine intake manifold pressure, and a hydraulic connection between said signal source and said accumulator piston, whereby a pressure force is established on the latter that tends to oppose the stroking movement thereof upon a pressure increase in said servo.

References Cited by the Examiner

UNITED STATES PATENTS

| | | | |
|---|---|---|---|
| 3,025,717 | 3/1962 | Christenson | 74—645 |
| 3,039,327 | 6/1962 | Breting | 74—720.5 |
| 3,180,173 | 4/1965 | Fisher et al. | 74—472 |

DAVID J. WILLIAMOWSKY, *Primary Examiner.*

T. C. PERRY, *Assistant Examiner.*